July 28, 1925.
H. SAMOVITZ
CHAIN CONNECTING HOOK
1,547,524
Filed Jan. 7, 1925
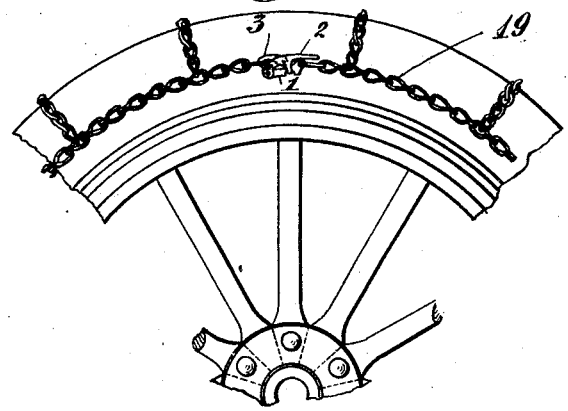
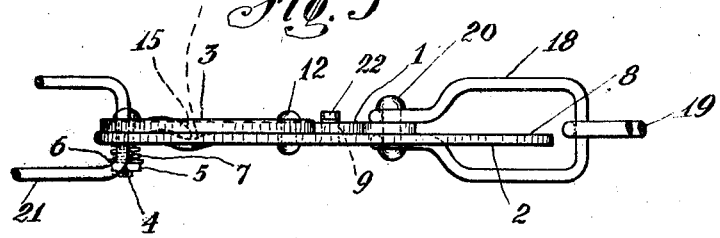
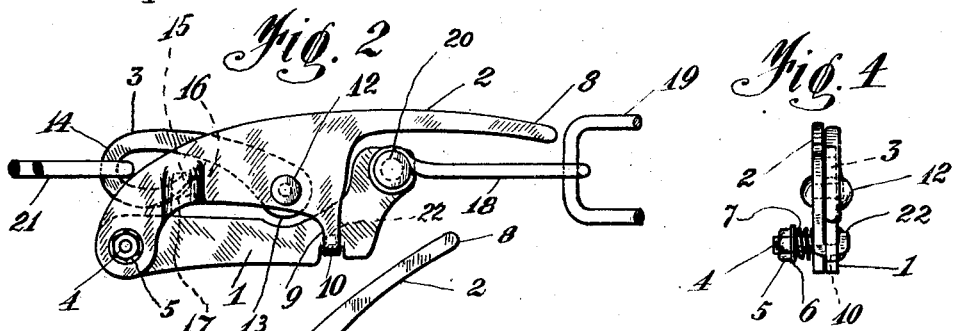
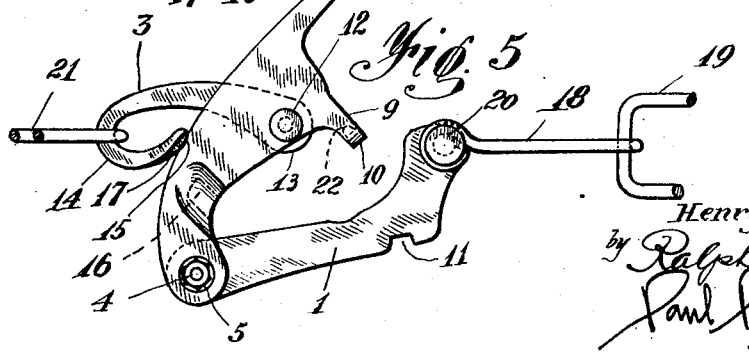
INVENTOR.
Henry Samovitz
by Ralph Donath and
Paul Purchord
Attorneys Patented July 28, 1925.

1,547,524

UNITED STATES PATENT OFFICE.

HENRY SAMOVITZ, OF McKEESPORT, PENNSYLVANIA.

CHAIN-CONNECTING HOOK.

Application filed January 7, 1925. Serial No. 985.

*To all whom it may concern:*

Be it known that I, HENRY SAMOVITZ, a citizen of Czechoslovakia, residing at McKeesport, in the county of Allegheny and State of Pennsylvania, have invented certain new and useful Improvements in Chain-Connecting Hooks, of which the following is a specification.

This invention relates to chain connecting hooks and more in particular to connecting hooks for non-skid automobile tire chains.

One of the primary objects of this invention is to provide a chain connecting hook which greatly facilitates the application of a non-skid chain around a tire. Another object is to provide such a connecting hook having a great leverage whereby a chain may be applied with considerable tension on a tire. Still another object is to provide a device which is positive in its application and which permits of the quick removal of a tire-chain when desired. Additional features and advantages of this device will appear from the following description considered in connection with the accompanying drawing which forms a part of this application and in which:

Fig. 1 is a fragmentary view showing the application of my chain connecting hook to a non-skid tire.

Fig. 2 is a side elevation of the connecting hook.

Fig. 3 is a top view of Fig. 2.

Fig. 4 is an end view of Fig. 2.

Fig. 5 represents the chain connecting hook in its "open" position.

Reference being had to the various figures, the chain connecting hook comprises three essential parts, namely, the link-member 1, the locking-lever 2 and the chain-hook 3. The locking-lever is loosely and hingedly connected to, and on the side of, the link-member by means of a bolt 4 having a nut 5, a washer 6, and a coiled spring 7 placed intermediate said washer and the locking member for the purpose of pressing the latter normally against the link-member. The locking-lever is provided with a reduced handle 8 for increasing the leverage thereof and has a depending tongue 9, the lower end of which is bent over to form a locking-hook 10 adapted to engage the opposite side of the link-member in a notch 11 cut therein.

The chain-hook is preferably given the curved shape shown in the drawing and is loosely secured to the side of the locking-lever, preferably by means of a rivet 12 which engages suitable apertures provided in the locking lever and in the widened part 13 of the chain-hook. The hooked portion 14 of the chain hook is sufficiently reduced in cross-section to offer a desired amount of resiliency, and the extreme end 15 thereof is slightly bent toward the locking-lever so that when the former is closed, said extreme end will press against the lever and engage a slight recess 16 pressed into the body of the locking lever, thereby holding the chain-hook in the closed position shown especially in Fig. 2. To assist in placing the chain-hook in its closed position, the lower edge of the same is preferably provided with a slight bevel 17 which prevents the bent end 15 to catch on the edge of the locking lever.

The link member 1 is permanently connected to the end link 18 of the chain 19 by means of a rivet 20, whereas the other end link 21 of said chain may be hooked into, or unhooked from, the chain-hook as required.

If it be desired to put the non-skid chain on a tire, the former is first wrapped around the tire in the usual manner and the locking-lever is opened as far as required to permit the hooking of the end link 21 to the chain-hook. The locking-lever is now turned toward the closed position and is then given a lateral pull to enable the locking-hook 10 to engage the notch 11 and the other side of the link-member, thereby securely locking the locking-lever into its closed position. As will be readily understood, the closing of the locking-lever will stretch the tire chain close to the tire and at the same time also cause the chain-hook to close and engage the recess 16, in which position it will be held by the tension in the tire chain as well as by the spring action of the extreme end of the chain-hook proper.

To open the chain connecting hook, all that is necessary is to press the locking-lever down until the tip 22 of the locking hook clears the bottom of the notch 11 and to pull the said lever away from the link-member after which the locking-lever will assume substantially the position shown in Fig. 5.

From the above description taken in connection with the accompanying drawing, it is thought that a clear and comprehensive understanding of the construction, operation and advantages of my invention may be had, and while I have shown and described my invention as embodying a specific structure, I desire that it be understood that I may make such changes in said construction as do not depart from the spirit and scope of the invention as claimed.

I claim:

1. A chain connecting hook of the character described comprising a link member; a locking-lever hingedly mounted thereon; a chain-hook hingedly mounted laterally upon said locking-lever and having part of its hook-portion bent toward said locking-lever to yieldingly engage same.

2. A chain connecting hook of the character described comprising a link-member; a locking lever hingedly mounted thereon; a chain-hook hingedly mounted laterally upon said locking-lever and having part of its hook-portion bent toward said locking-lever, and a recess positioned in the latter and adapted to be engaged by said bent hook-portion.

In testimony whereof I affix my signature.

HENRY SAMOVITZ.